US012579474B2

(12) United States Patent
Elsken

(10) Patent No.: US 12,579,474 B2
(45) Date of Patent: Mar. 17, 2026

(54) METHOD AND DEVICE FOR CONTINUAL MACHINE LEARNING OF A SEQUENCE OF DIFFERENT TASKS

(71) Applicant: Robert Bosch GmbH, Stuttgart (DE)

(72) Inventor: Thomas Elsken, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 676 days.

(21) Appl. No.: 18/152,931

(22) Filed: Jan. 11, 2023

(65) Prior Publication Data

US 2023/0229969 A1      Jul. 20, 2023

(30) Foreign Application Priority Data

Jan. 18, 2022    (DE) ..................... 10 2022 200 546.5

(51) Int. Cl.
*G06N 20/00*          (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| | | | | |
|---|---|---|---|---|
| 9,826,149 | B2 * | 11/2017 | Chalom | H04N 23/80 |
| 11,995,553 | B2 * | 5/2024 | Groh | G06F 18/211 |
| 12,194,631 | B2 * | 1/2025 | Berkenkamp | B25J 9/1661 |
| 12,288,382 | B2 * | 4/2025 | Guo | G06N 3/09 |
| 2021/0142286 | A1 * | 5/2021 | Hajian | G06F 16/951 |
| 2022/0012636 | A1 * | 1/2022 | Lindauer | G06N 5/01 |
| 2022/0076114 | A1 * | 3/2022 | Shaker | G06N 3/08 |
| 2022/0292349 | A1 * | 9/2022 | Stoll | G06N 3/08 |
| 2022/0398262 | A1 * | 12/2022 | Derakhshani | G06N 3/0499 |

OTHER PUBLICATIONS

Mirzadeh et al., "Linear Mode Connectivity in Multitask and Continual Learning," Cornell University, 2020, pp. 1-21. <https://arxiv.org/pdf/2010.04495.pdf> Downloaded Dec. 30, 2022.
Ha et al., "Hypernetworks," Cornell University, 2016, pp. 1-29. <https://arxiv.org/pdf/1609.09106.pdf> Downloaded Dec. 30, 2022.
Schmidhuber, Jürgen: "Learning to control fast-weight memories: An alternative to dynamic recurrent networks," Neural Computation, 1992, 4(1), (1992), pp. 131-139.

* cited by examiner

*Primary Examiner* — Maikhanh Nguyen
(74) *Attorney, Agent, or Firm* — NORTON ROSE FULBRIGHT US LLP

(57)          ABSTRACT
A method for parameterizing a function, which outputs an ideal parameterization of a machine learning system for a large number of different data sets. A first training of a machine learning system is carried out in succession on multiple training data sets, the individual optimized parameterizations of the machine learning system being stored for each of the training data sets. A second training of the machine learning system simultaneously on all data sets then follows, the optimal parameterization of the machine learning system being stored. An optimization of the parameterization of the function thereupon follows in such a way that, given an optimal parameterization of the first training, the function outputs the associated optimal parameterization of the second training.

8 Claims, 8 Drawing Sheets

METHOD AND DEVICE FOR CONTINUAL MACHINE LEARNING OF A SEQUENCE OF DIFFERENT TASKS

CROSS REFERENCE

The present application claims the benefit under 35 U.S.C. § 119 of German Patent Application No. DE 10 2022 200 546.5 filed on Jan. 18, 2022, which is expressly incorporated herein by reference in its entirety.

FIELD

The present invention relates to a method for continual machine learning using a projection function and a device, a computer program, and a machine-readable memory medium which are each configured to carry out the method.

BACKGROUND INFORMATION

Continual learning for deep learning relates to the problem of learning multiple tasks $T_1, \ldots T_n$ in a sequence, i.e., a machine learning system, for example a neural network, is first trained on $T_1$, then on $T_2$, etc. A common problem in this approach is that it results in catastrophic forgetting. This means that after the training of the neural network on task n, the performance on tasks $1, \ldots, n-1$ strongly degenerates, i.e., the neural network "forgets" them. In contrast thereto, in the case of joint training on all tasks (also called multi-tasking), the neural network is capable of successfully learning all tasks.

Mirzadeh, Seyed Iman, et al. "Linear mode connectivity in multitask and continual learning." arXiv preprint arXiv: 2010.04495 describes an algorithm which forces the successively learned minima of continual learning to behave like a multitasking solution.

SUMMARY

The present invention provides a meta-learning approach, in which it is learned in an offline phase how to project a continually learned parameterization $w_{cl}$ on the multitask solution $w_{mt}$ via a projection function $H:w_{cl} \to w_{mt}$. After the offline phase, learned projection function H may then be used to project the continually learned parameterization $w_{cl}$ on the multitask solution $w_{mt}$ for new tasks, without data from earlier tasks having to be stored.

This is advantageous a) for mathematical reasons and b) for reasons of data protection in applications in which data protection is critical (for example, various tasks could relate to data of various end-users).

In other words, the present invention may have the advantage that it is particularly memory-efficient, since it is not necessary to store data from previously seen tasks. The present invention may therefore be carried out on systems having particularly small memories.

Further aspects of the present invention and advantageous refinements of the present invention are disclosed herein.

In a first aspect, the present invention relates to a computer-implemented method for parameterizing a function, which outputs an ideal parameterization of a machine learning system for a large number of different data sets.

According to an example embodiment of the present invention, the method begins with a provision of a plurality of (different) training data sets $T_1, \ldots, T_n$, a unique index k being associated with each data set. The training data sets are preferably structured in such a way that they include training input variables and training output variables each associated with the training input variables. The training data sets may differ from one another in that the training output variables of the individual data sets are different, for example, characterizing different objects. Additionally or alternatively, the training input variables may also differ from one another, for example, in that the training input variables of the different data sets represent different objects. A unique index may be understood to mean that each value of the indexes exists once and thus each data set has a different index value. A sequence of directly sequential numbers are preferably used as the indexes.

The function to be parameterized may thereupon be provided and preferably initially randomly parameterized.

A multiple repetition of the following sequence of steps i. through iv. thereupon follows:

i. Randomly drawing one index ($k \in 1 <= k <= n$) from the plurality of the indexes which are associated with the training data sets;

ii. First training of a machine learning system, the machine learning system being trained in succession on the basis of the individual data sets having their index less than or equal to the index drawn. The term training may in general be understood to mean that the parameters of the machine learning system are optimized, so that the machine learning system learns the relationships within the respective data set to output the training output variables of the data set. The training may be carried out using a gradient descent method. During the first training, for the individual data sets used in step ii., the parameterizations of machine learning system $w_{k_{cl}}$ optimized for this purpose are stored. In other words, during the first training, so-called continual learning is carried out on data sets iii. Second training of the machine learning system on the basis of all data sets having index less than or equal to the index drawn. The optimal parameterization of the machine learning system obtained in this case is stored. In other words, multitasking learning is carried out here on data sets $T_1, \ldots, T_k$, in order to achieve a suitable parameterization of machine learning system $w_{k_{mt}}$ on all training data sets drawn. The first training accordingly differs from the second training in that in the first training the training takes place on the individual data sets in succession, while in the second training the data sets are used simultaneously.

iv. The parameterizations of the first training are thereupon associated with the parameterization of the second training. The parameterizations of the continual learning are thus associated with the parameterization of the multitask learning.

An optimization of parameterization $\theta$ of function H follows thereupon in such a way that, given a parameterization of the first training, the associated parameterization of the second training is output by function H.

It is provided that the optimization of parameterization $\theta$ of function H takes place in such a way that a cost function is minimized, the cost function characterizing a difference between the output parameterizations by the function to the ascertained parameterizations in the second training and/or a difference between a prediction accuracy of the machine learning system on the basis of the output parameterizations by the function to the prediction accuracy of the machine learning system on the basis of ascertained parameterizations in the second training.

The optimization of parameter $\theta$ of the function may be given formalistically as follows: $\theta = \mathrm{argmin}_\theta \, L(H(w_{k_{cl}}|\theta),$ $w_{k_{mt}}$). Cost function L is preferably a regression cost function. One alternative is that the cost function is not minimized in the "parameter space," but rather in the "function space"; i.e., if N is the machine learning system (for example a neural network but also any other model) parameterized by w, the optimization could then read as follows: $\mathrm{argmin}_\theta$ $L(N(H(w_{k_{el}}|\theta)),N(w_{k_{mt}}))$.

This alternative has the advantage that a number of parameters w does not necessarily have to be identical, but the outputs which the machine learning system achieves with its parameters do. In this case, cost function L may be a typical cost function for classification problems, for example a cross entropy.

In addition to the advantage that via this alternative, machine learning systems having different sizes and thus different numbers of parameters may be provided, machine learning systems having quantified weights may also be provided in this way.

Furthermore, according to an example embodiment of the present invention, it is provided that in the first training, the machine learning system is trained in succession on the data sets, a sequence of the use of the data sets for the successive training on the data sets taking place as a function of the index of the data sets. In addition, the first training is preferably again carried out on a permuted sequence of the data sets, the optimized parameterizations of the machine learning system obtained in this case also being associated with the parameterization from the second training. The training data set for optimizing the function is thus enlarged and a generalization of function H is therefore improved.

Furthermore, according to an example embodiment of the present invention, it is provided that the machine learning system has a smaller architecture for the second training than in the first training or the machine learning system is compressed with respect to its architecture after the second training, function H being parameterized in such a way that function H essentially maps the parameterization of the first training on the parameterization of the second training. This has the advantage that compressed machine learning systems are generated, which may also be executed on systems having particularly limited computer resources.

Furthermore, according to an example embodiment of the present invention, it is provided that the machine learning system has quantified parameters for the second training or parameters of the machine learning system are quantified after the second training (for example, using conventional quantification methods), function H being parameterized in such a way that function H maps the parameterization of the first training on the quantified parameterization. This procedure has the advantage that a particularly memory-efficient machine learning system may be achieved by the quantified parameterization.

Furthermore, according to an example embodiment of the present invention, it is provided that the function is a linear function or a neural network. The function is particularly preferably a hypernetwork, see: https://arxiv.org/pdf/1609.09106.pdf.

Function H may additionally also be a function of an architecture of the machine learning system, i.e., the function additionally receives as an input variable a variable which characterizes the architecture of the machine learning system. Function H is then preferably a graph neural network.

In a second aspect of the present invention, a computer-implemented method for further training of a machine learning system is provided, so that the machine learning system retains its prior properties; i.e., it essentially retains its performance on the data sets on which it was previously trained. Properties may thus be a classification accuracy, an error rate, or the like.

According to an example embodiment of the present invention, the method of the second aspect begins with providing present parameterization w of the machine learning system and function H, which was created according to the first aspect of the present invention. This is followed by providing a new data set $T_{j+1}$ and training the machine learning system on the basis of the new data set to obtain an optimal parameterization $w_{j+1_{cl}}$. This is followed by adapting the parameterization of the machine learning system by using the ascertained parameterization with the aid of the function in dependence on the optimal parameterization $w_{new}=H(w_{j+1_{cl}}|\theta)$.

In a further aspect of the present invention, a computer-implemented method for using the further trained machine learning system according to the second aspect of the present invention as a classifier for classifying sensor signals is provided. The classifier is taken over using the method according to one of the preceding aspects of the present invention, including the steps: receiving a sensor signal which includes data from the image sensor, determining an input signal which is dependent on the sensor signal, and feeding the input signal into the classifier in order to obtain an output signal which characterizes a classification of the input signal.

Furthermore, it is provided for all aspects of the present invention that the input variables of the machine learning system are images and the machine learning system is an image classifier.

The image classifier associates an input image with one or multiple classes of a predetermined classification. For example, images of nominally identical products manufactured in series may be used as input images. The image classifier may be trained, for example, to associate the input images with one or multiple of at least two possible classes, which represent a quality assessment of the particular product.

The image classifier, for example a neural network, may be equipped with a structure such that it is trainable, for example, to identify and distinguish pedestrians and/or vehicles and/or traffic signs and/or traffic signals and/or road surfaces and/or human faces and/or medical anomalies in imaging sensor images. Alternatively, the classifier, for example a neural network, may be equipped with such a structure, which is trainable to identify spoken commands in audio sensor signals.

The concept of the image includes in principle any distribution of pieces of information situated in a two-dimensional or multidimensional grid. These pieces of information may be, for example, intensity values of image pixels which were recorded using an arbitrary imaging modality, for example using an optical camera, using an infrared camera, or using ultrasound. Any other data, for example, audio data, radar data, or LIDAR data, may also be converted into images and then classified similarly, however.

Furthermore, it is provided that the machine learning system including a parameterization according to the preceding aspects of the present invention is used for computer-based vision (computer vision), in particular for image classifications.

Furthermore, it is provided that this machine learning system ascertains an output variable as a function of a detected sensor variable of a sensor, as a function of which a control variable may thereupon be ascertained with the aid of a control unit, for example.

According to an example embodiment of the present invention, the control variable may be used to control an actuator of a technical system. The technical system may, for example, be an at least semiautonomous machine, an at least semiautonomous vehicle, a robot, a tool, a factory machine, or a flying object such as a drone. The input variable may be ascertained, for example, as a function of detected sensor data and provided to the machine learning system. The sensor data may be detected by a sensor, for example a camera, of the technical system or alternatively may be received from the outside.

In further aspects, the present invention relates to a device and a computer program which are each configured to carry out the above methods, and a machine-readable memory medium on which this computer program is stored.

Specific embodiments of the present invention are explained in greater detail hereinafter with reference to the figures.

DETAILED DESCRIPTION OF EXAMPLE EMBODIMENTS

Figure 1:
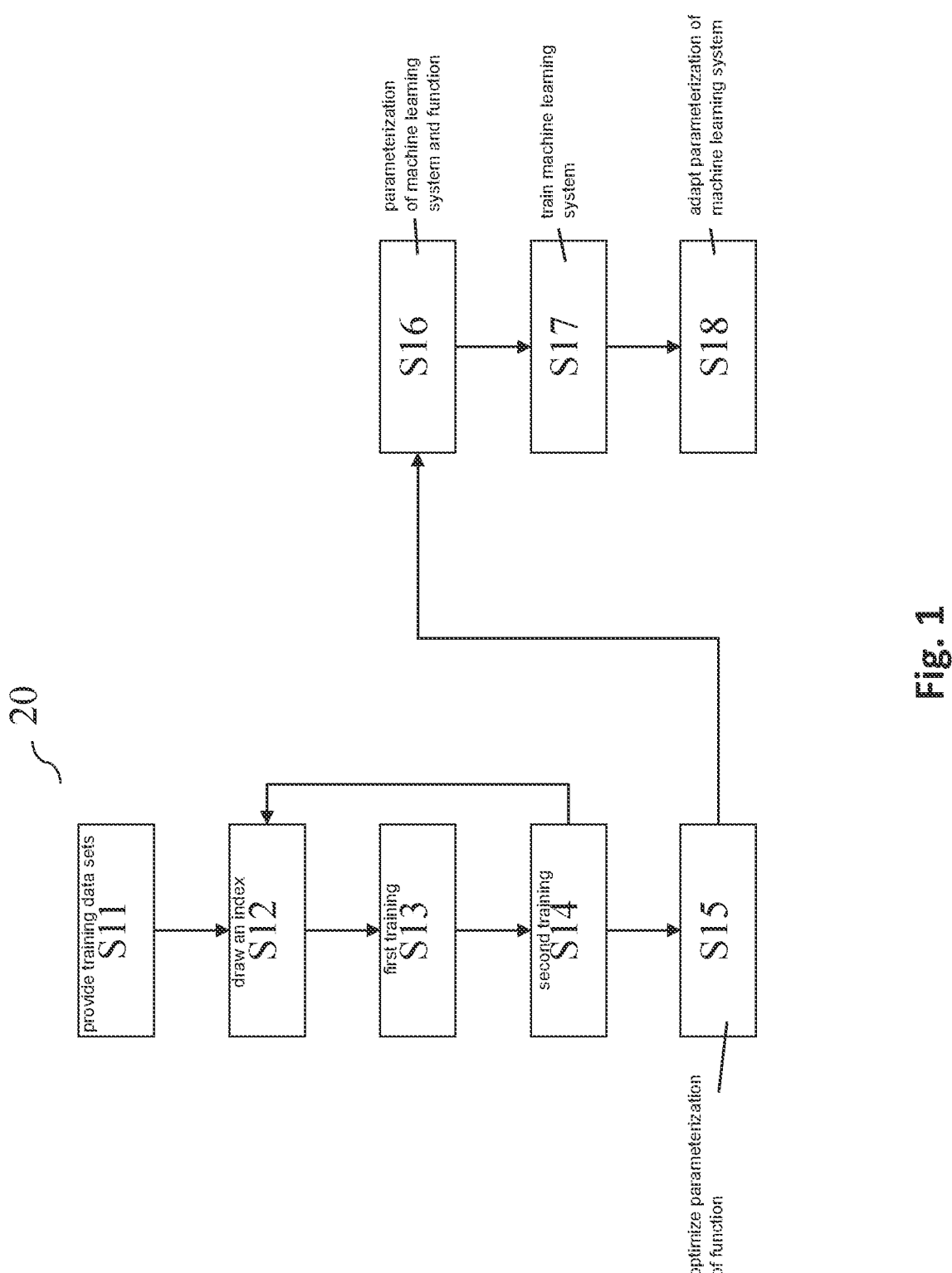
FIG. 1 schematically shows a flowchart of one specific example embodiment of the present invention.

A continual learning problem is assumed hereinafter. This means that a machine learning system (for example a neural network) is trained in succession on various data sets (in this context also referred to as various tasks); i.e., with given tasks $T_1, \ldots, T_n$, a neural network N is trained sequentially on these tasks.

This may be carried out as follows by a pseudo-algorithm:
1) train N on $T_1$, in order to solve $T_1$, which results in an optimal parameterization $w_{1_{cl}}$ of the machine learning system with respect to $T_1$;
2) train N on $T_2$ (starting from $w_{1_{cl}}$) on $T_2$, in order to solve $T_2$, which results in optimal parameterization $w_{2_{cl}}$ with respect to $T_2$;
3) repeat the steps to $T_n$.

Unfortunately, this method suffers from catastrophic forgetting, which means that the performance of machine learning system N including weights $w_{i_{cl}}$ is poor in the case of all tasks $T_j$ with i≠j.

On the other hand, it has been shown that in another environment (the multitasking environment), in which machine learning system N is trained jointly on all preceding tasks, the performance is strong in all tasks.

The multitasking setting may be carried out as follows by a pseudo-algorithm:
1) train N on $T_1$, in order to solve $T_1$, which results in an optimal parameterization $w_{1_{mt}}$;
2) train N on $T_2$ and on $T_1$, in order to solve $T_2$ and $T_1$, which results in an optimal parameterization $w_{2_{mt}}$;
3) repeat step 2) to $T_n$.

In this case, the performance of N having parameterization $w_{i_{mt}}$ is strong in all tasks $T_j$ with j<=i, but presumes that in the training on $T_i$, access to $T_j$ with j<=i is provided.

An offline meta-learning phase is provided, in which a projection operator H is trained using parameter θ, with the goal of projecting continual learning solution $w_{i_{cl}}$ on multitask solution $w_{i_{mt}}$, without requiring access to $T_j, j<=i$: H $(w_{i_{cl}}|θ)=w_{i_{mt}}$. Parameter θ of projection H is learned in an offline phase with the aid of meta-learning and may then be reused in an online/test time phase.

The pseudocode for this purpose may appear as follows:
Phase I [Meta-Learning Phase for Learning Parameter θ—Offline Phase]:
providing tasks $T_1, \ldots, T_n$;
initializing θ;
loop including following steps:
1) draw task index k:1<=k<=n;
2) execute CL using $T_1, \ldots, T_k$ in order to obtain parameterization $w_{k_{cl}}$, preferably k random tasks being drawn and particularly preferably the sequence of the tasks varying;
3) executing multitasking learning using $T_1, \ldots, T_k$ in order to obtain $w_{k_{mt}}$;
4) optimizing θ by way of θ=argmin$_θ$ Loss(H($w_{k_{cl}}$|θ), $w_{k_{mt}}$);
Phase II [Meta Testing—Online Phase]:
Providing present parameterization w of machine learning system N;
when a new task $T_{j+1}$ is provided:
1) training machine learning system N(w) for $T_{j+1}$, in order to obtain an optimal parameterization $w_{j+1_{cl}}$;
2) adapting the parameterization of the machine learning system to w=H($w_{j+1_{cl}}$|θ);
Projection H may be provided here by any parameterizable function, for example, a linear mapping or by a neural network. The cost function (loss function) in phase I, line 4 may be an arbitrary measure of a difference, for example, a regression loss or an arbitrary norm.

FIG. 1 schematically shows a flowchart 20 of a method for parameterizing function H, which outputs an ideal parameterization of a machine learning system for a large number of different data sets.

In the first step, a provision S11 of a plurality of training data sets $T_1, \ldots, T_n$ takes place, an index k being associated with each training data set.

The following steps are thereupon repeated multiple times:

Randomly drawing S12 an index (k∈1<=k<=n). First training S13 of a machine learning system in succession on the training data sets having an associated index less than or equal to the index drawn, individual optimized parameterizations $w_{k_{cl}}$ of the machine learning system being stored for each of the training data sets. Second training S14 of the machine learning system simultaneously on all data sets having an associated index less than or equal to the index drawn, optimal parameterization $w_{k_{mt}}$ of the machine learning system being stored. Associating the parameterizations of first training S13 with the parameterization of second training S14.

After steps S12 through S14 have been repeated often enough, for example, until an abort criterion has been met, optimization S15 of parameterization $\theta$ of function H follows in such a way that given a parameterization $w_{k_{cl}}$ of the first training, the function outputs associated parameterization $w_{k_{mt}}$ of the second training. Conventional training algorithms such as SGD or back propagation may be used for optimization S15.

After ending step S15, the method may be ended and the parameterized function may be output.

It is possible that after step S15, still further steps may be carried out, for example, when a new training data set is provided for which the machine learning system is also to have a good prediction accuracy, a performance of the machine learning system not being made worse for the previously used data sets.

The following steps may then be carried out.

Providing S16 present parameterization w of the machine learning system and function H after step S15.

Providing S16 a new data set $T_{j+1}$.

Training S17 the machine learning system on the basis of new data set $T_{j+1}$, in order to obtain a new, optimal parameterization $w_{j+1_{cl}}$ for the new data set.

Ascertaining, with the aid of function H in dependence on new, optimal parameterization $w_{j+1_{cl}}$, a parameterization which achieves a good performance on all data sets and adapting S18 the parameterization of the machine learning system using the output parameterization of function H.

The machine learning system obtained according to step S18 may be used as explained hereinafter.

Figure 2:
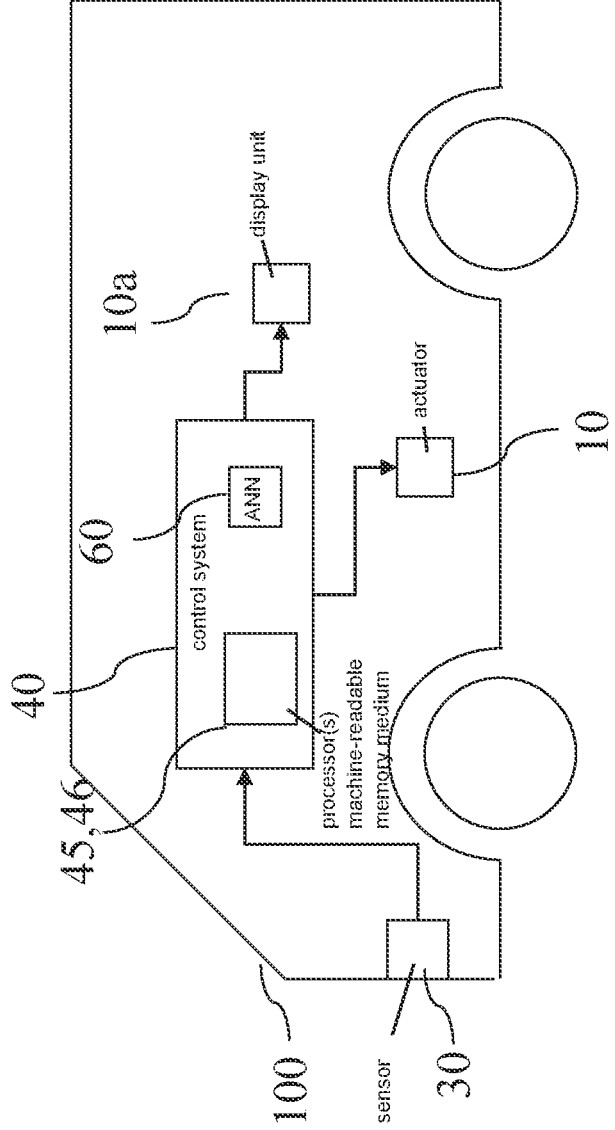
FIG. 2 schematically shows an exemplary embodiment of the control of an at least semiautonomous robot, according to the present invention.

FIG. 2 schematically shows an actuator including a control system 40. At preferably regular time intervals, surroundings 20 of actuator 10 are detected using a sensor 30, in particular an imaging sensor such as a video sensor, which may also be provided by a plurality of sensors, for example a stereo camera. Other imaging sensors are also possible, for example, radar, ultrasound, or LIDAR. An infrared camera is also possible. Sensor signal S—or one sensor signal S each in the case of multiple sensors—of sensor 30 is transferred to control system 40. Control system 40 therefore receives a sequence of sensor signals S. Control system 40 ascertains activation signals A therefrom, which are transferred to an actuator 10. Actuator 10 may convert received control commands into mechanical movements or changes of physical variables. Actuator 10 may convert, for example, control command A into an electrical, hydraulic, pneumatic, thermal, magnetic, and/or mechanical movement or induce a change. Specific, but nonrestrictive examples are electric motors, electroactive polymers, hydraulic cylinders, piezoelectric actuators, pneumatic actuators, servomechanisms, solenoids, stepping motors, etc.

Control system 40 receives the sequence of sensor signals S of sensor 30 in an optional receiving unit 50, which converts the sequence of sensor signals S into a sequence of input images x (alternatively, sensor signal S may also be accepted in each case as an input image x). Input image x may be, for example, a detail or a further processing of sensor signal S. Input image x includes single frames of a video recording. In other words, input image x is ascertained as a function of sensor signal S.

The sequence of input images x is supplied to the machine learning system from step S18, in the exemplary embodiment an artificial neural network 60.

Artificial neural network 60 is preferably parameterized by parameters which are stored in a parameter memory and provided thereby.

Artificial neural network 60 ascertains output variables y from input images x. These output variables y may in particular include a classification and/or semantic segmentation of input images x. Output variables y are supplied to an optional forming unit 80, which ascertains activation signals A therefrom, which are supplied to actuator 10 in order to activate actuator 10 accordingly. Output variable y includes pieces of information about objects which sensor 30 has detected.

Actuator 10 receives activation signals A, is activated accordingly, and carries out a corresponding action. Actuator 10 may include an activation logic (not necessarily structurally integrated) for this purpose, which ascertains a second activation signal from activation signal A, using which actuator 10 is then activated.

In other specific embodiments, control system 40 includes sensor 30. In still other specific embodiments, control system 40 alternatively or additionally also includes actuator 10.

In other preferred specific embodiments, control system 40 includes one or a plurality of processors 45 and at least one machine-readable memory medium 46, on which instructions are stored which, when they are executed on processors 45, prompt control system 40 to carry out the method according to the present invention.

In alternative specific embodiments, alternatively or additionally to actuator 10, a display unit 10a is provided, which may display an output variable of control system 40.

In other specific embodiments, display unit 10a may be an output interface to a playback device, e.g., a display, a light source, a loudspeaker, a vibration motor, etc., which may be used to generate a sensorially perceptible output signal.

In a preferred specific embodiment of FIG. 2, control system 40 is used to control the actuator, which here is an at least semiautonomous robot, here an at least semiautonomous motor vehicle 100. Sensor 30 may be, for example, a video sensor, preferably situated in motor vehicle 100.

Actuator 10 situated in motor vehicle 100 may preferably be a brake, a drive, or a steering system of motor vehicle 100. Activation signal A may be ascertained in such a way that actuator or actuators 10 is/are activated in such a way that motor vehicle 100 prevents, for example, a collision with the objects reliably identified by artificial neural network 60, in particular if these are objects of specific classes, for example pedestrians.

Alternatively, the at least semiautonomous robot may also be another mobile robot (not shown), for example one that moves by flying, swimming, diving, or stepping. The mobile robot may also, for example, be an at least semiautonomous lawnmower or an at least semiautonomous cleaning robot. In these cases activation signal A may also be ascertained in such a way that drive and/or steering of the mobile robot are activated in such a way that the at least semiautonomous robot prevents, for example, a collision with objects identified by artificial neural network 60.

Figure 3:
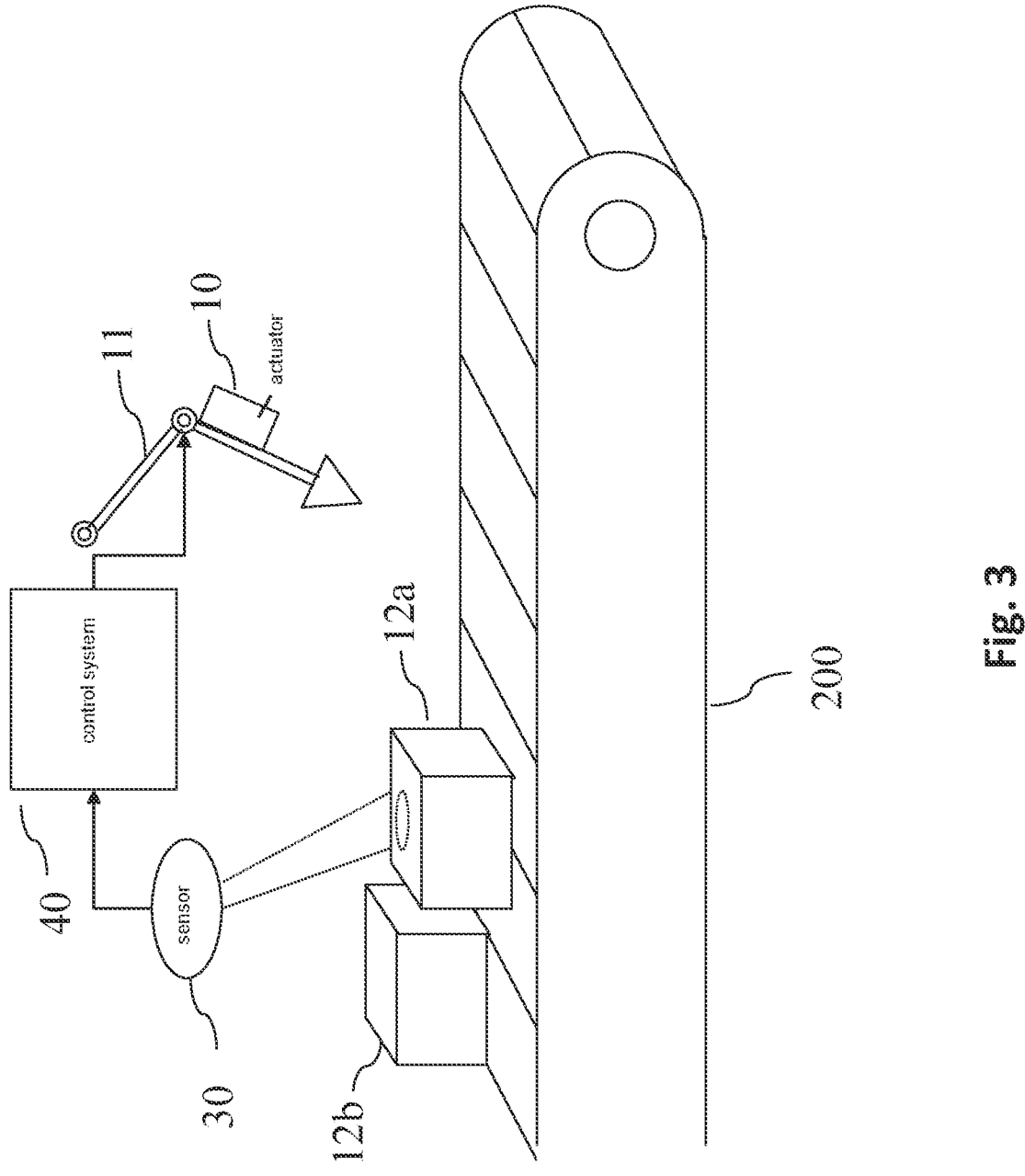
FIG. 3 schematically shows an exemplary embodiment of the control of a manufacturing system, according to the present invention.

FIG. 3 shows an exemplary embodiment in which control system 40 is used to activate a manufacturing machine 11 of a manufacturing system 200, in that an actuator 10 controlling this manufacturing machine 11 is activated. Manufacturing machine 11 may be, for example, a machine for stamping, sawing, drilling, milling, and/or cutting.

Sensor 30 may be, for example, an optical sensor, which detects, for example, properties of manufactured products 12a, 12b. It is possible that these manufactured products 12a, 12b are movable. It is possible that actuator 10 controlling manufacturing machine 11 is activated as a function of an association of detected manufacturing products 12a, 12b, so that manufacturing machine 11 accordingly executes a following processing step on the correct one of manufacturing products 12a, 12b. It is also possible that by identifying the correct properties of the same one of manufacturing products 12a, 12b (i.e., without a mismatch), manufacturing machine 11 accordingly adapts the same manufacturing step for processing of a following manufactured product.

Figure 4:
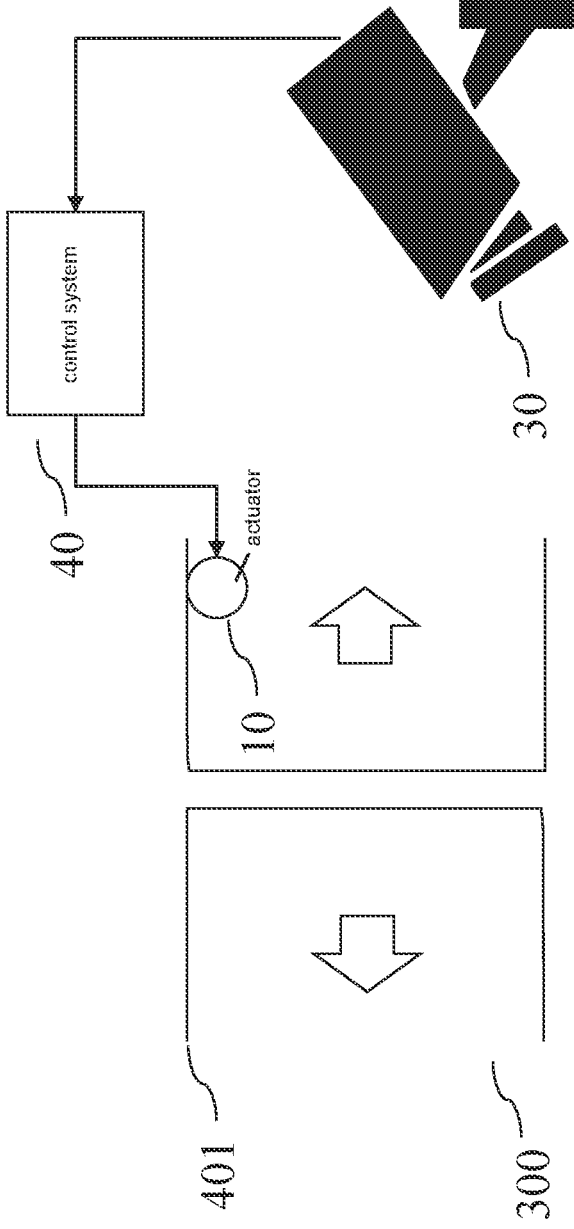
FIG. 4 schematically shows an exemplary embodiment of the control of an access system, according to the present invention.

FIG. 4 shows an exemplary embodiment in which control system 40 is used to control an access system 300. Access system 300 may include a physical access control, for example, a door 401. Video sensor 30 is configured to detect a person. This detected image may be interpreted with the aid of object identification system 60. If multiple persons are detected at the same time, for example, the identity of the persons may be ascertained particularly reliably by an association of the persons (thus the objects) with one another, for example, by an analysis of their movements. Actuator 10 may be a lock, which releases the access control, or not, for example opens door 401, or not, as a function of activation signal A. For this purpose, activation signal A may be selected as a function of the interpretation of object identification system 60, for example, as a function of the ascertained identity of the person. Instead of the physical access control, a logical access control may also be provided.

Figure 5:
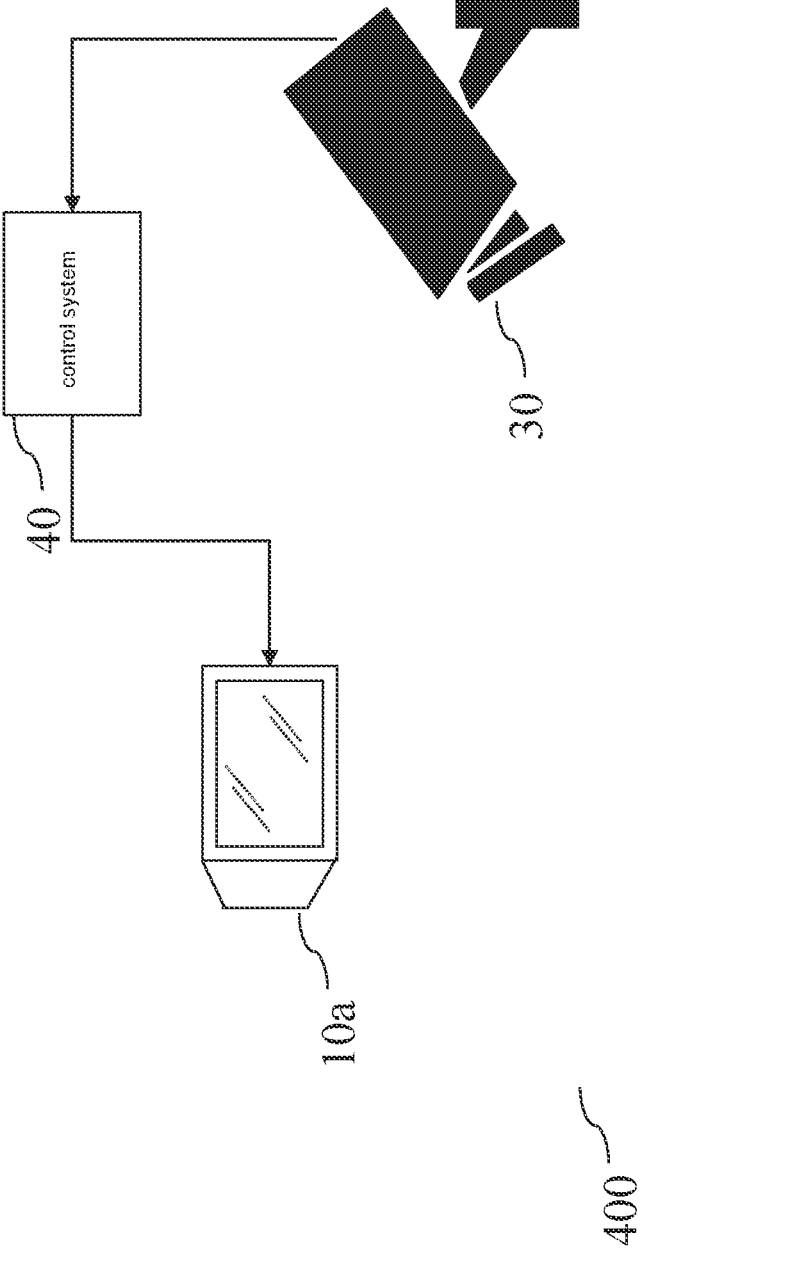
FIG. 5 schematically shows an exemplary embodiment of the control of a monitoring system, according to the present invention.

FIG. 5 shows an exemplary embodiment in which control system 40 is used to control a monitoring system 400. This exemplary embodiment differs from the exemplary embodiment shown in FIG. 5 in that instead of actuator 10, display unit 10a is provided, which is activated by control system 40. For example, an identity of the objects recorded by video sensor 30 may be ascertained reliably by artificial neural network 60, in order to conclude as a function thereof, for example, which are suspicious, and activation signal A may then be selected in such a way that this object is displayed highlighted in color by display unit 10a.

Figure 6:
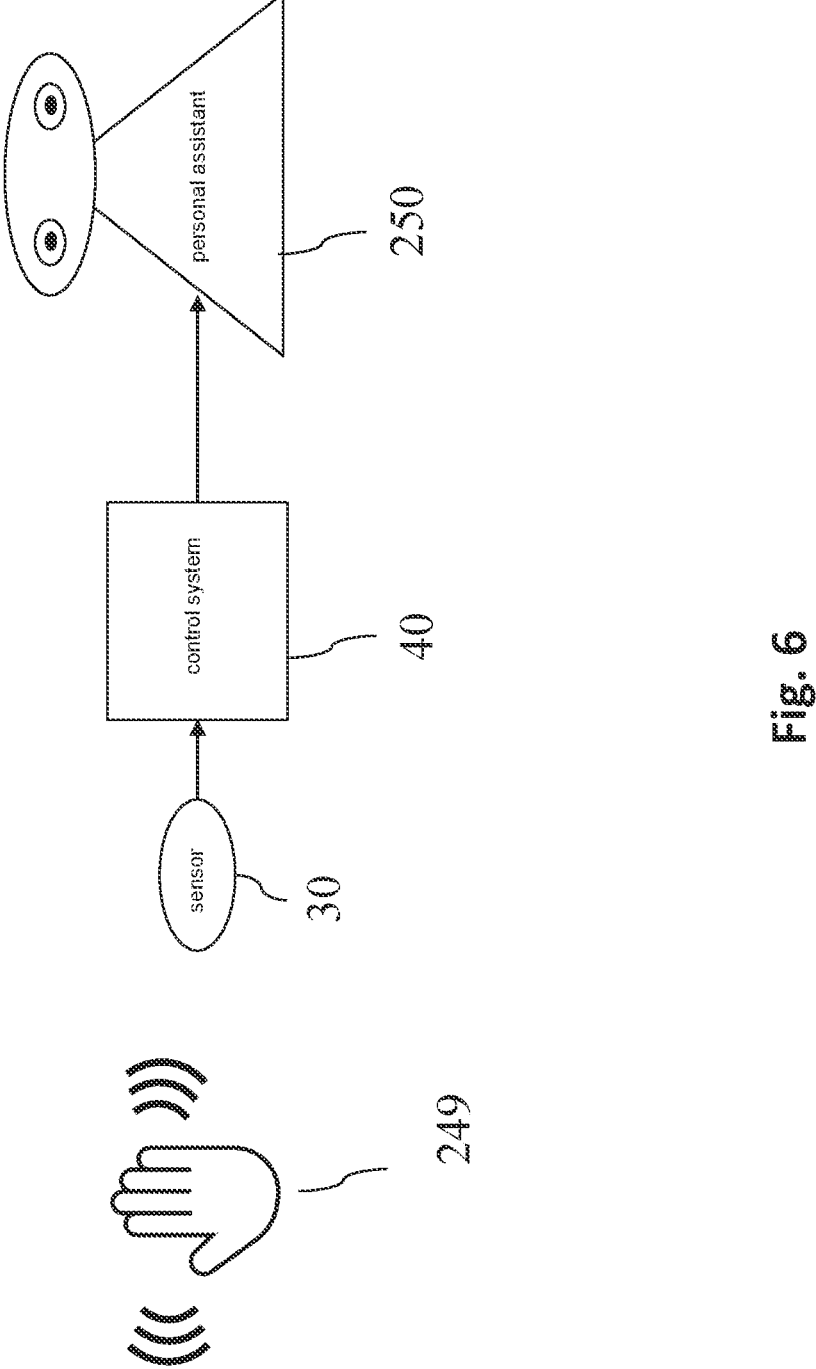
FIG. 6 schematically shows an exemplary embodiment of the control of a personal assistant, according to the present invention.

FIG. 6 shows an exemplary embodiment in which control system 40 is used to control a personal assistant 250. Sensor 30 is preferably an optical sensor, which receives images of a gesture of a user 249.

As a function of the signals of sensor 30, control system 40 ascertains an activation signal A of personal assistant 250, for example, in that the neural network carries out a gesture recognition. This ascertained activation signal A is then transferred to personal assistant 250 and it is activated accordingly. This ascertained activation signal A may be selected in particular in such a way that it corresponds to a presumed desired activation by user 249. This presumed desired activation may be ascertained as a function of the gesture recognized by artificial neural network 60. Control system 40 may then, as a function of the presumed desired activation, select activation signal A for transfer to personal assistant 250 and/or select activation signal A for transfer to the personal assistant in accordance with presumed desired activation 250.

This corresponding activation may include, for example, personal assistant 250 retrieving pieces of information from a database and reproducing them so they are receivable by user 249.

Instead of personal assistant 250, a domestic appliance (not shown), in particular a washing machine, a stove, an oven, a microwave oven, or a dishwasher may also be provided in order to be activated accordingly.

Figure 7:
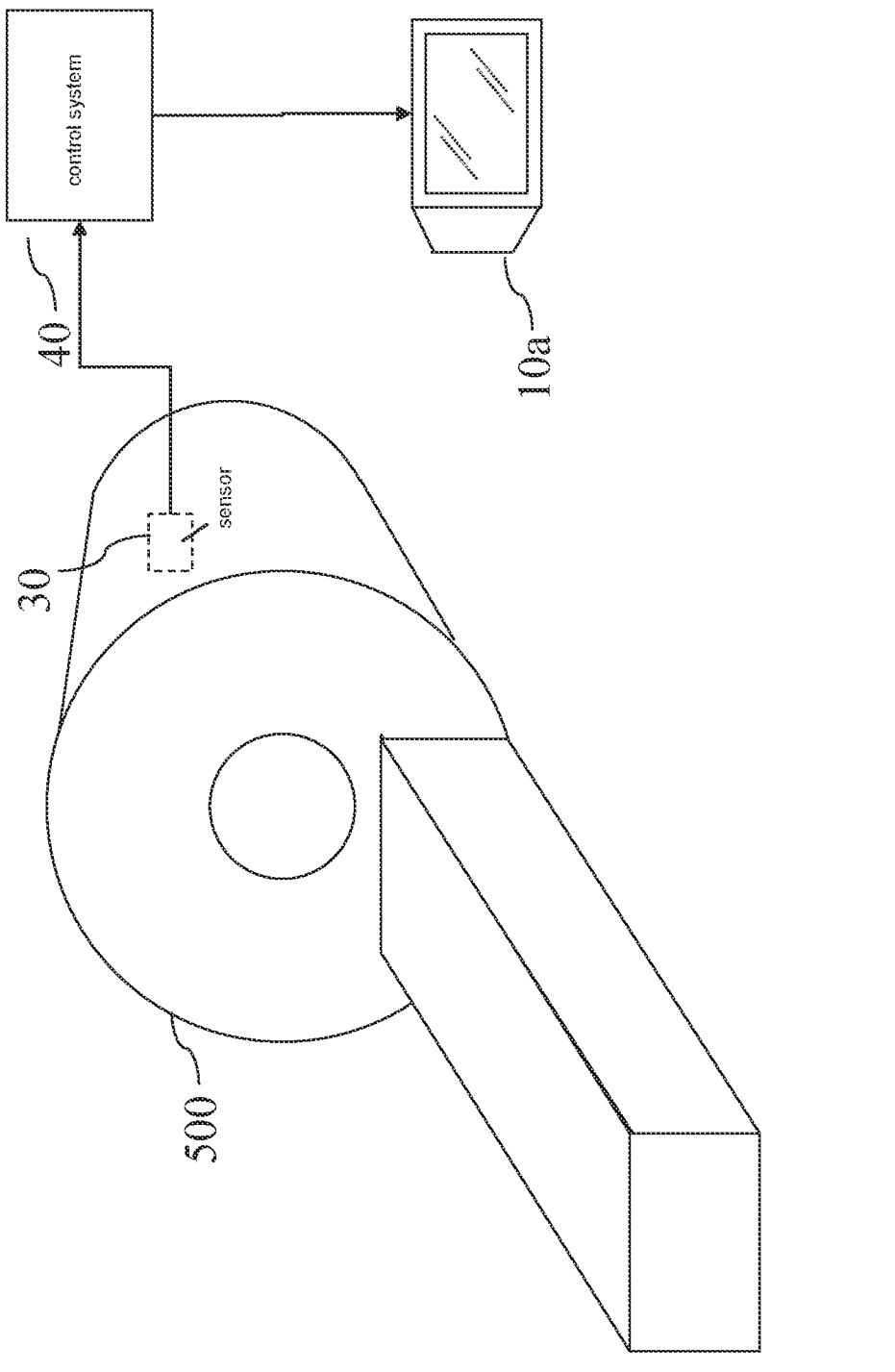
FIG. 7 schematically shows an exemplary embodiment of the control of a medical imaging system, according to the present invention.

FIG. 7 shows an exemplary embodiment in which control system 40 is used to control a medical imaging system 500, for example, an MRT, x-ray, or ultrasonic device. Sensor 30 may be provided, for example, by an imaging sensor, display unit 10a is activated by control system 40. For example, it can be ascertained by neural network 60 whether an area recorded by the imaging sensor is noteworthy, and activation signal A may then be selected in such a way that this area is displayed highlighted in color by display unit 10a.

Figure 8:
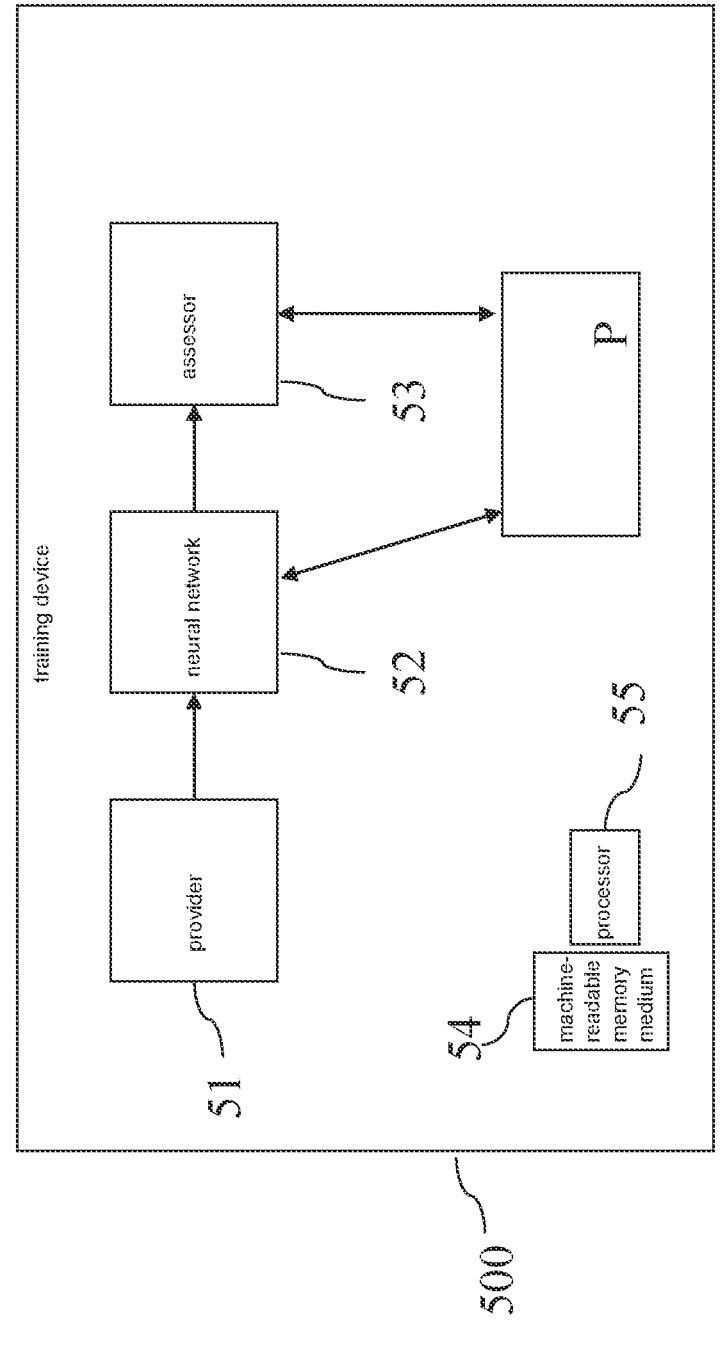
FIG. 8 schematically shows a training device, according to an example embodiment of the present invention.

FIG. 8 schematically shows a training device 500 including a provider 51, which provides input images from a training data set. Input images are supplied to neural network 52 to be trained, which ascertains output variables therefrom. Output variables and input images are supplied to an assessor 53, which ascertains updated hyperparameters therefrom, which are transferred to parameter memory P and replace the present parameters therein. Assessor 53 is configured, for example, to carry out steps S13 and S14 and S17 of the method according to FIG. 1.

The method carried out by training device 500 may be stored implemented as a computer program on a machine-readable memory medium 54 and executed by a processor 55.

The term "computer" includes any devices for processing predefinable calculation rules. These calculation rules may be provided in the form of software, or in the form of hardware, or also in a mixed form of software and hardware.

What is claimed is:

1. A method for parameterizing a function, which outputs a parameterization of a machine learning system for a large number of different data sets, comprising the following steps:

providing a plurality of training data sets, an index (k) being associated with each of the training data sets;

repeating the following sequence of steps i. through iv. multiple times:

i. randomly drawing an index ($k \in 1 <= k <= n$), ii. first training the machine learning system in succession on the training data sets having an associated index less than or equal to the index drawn, individual optimized parameterizations of the machine learning system being stored for each of the training data sets;

iii. second training the machine learning system on all data sets having an associated index less than or equal to the index drawn, optimal parameterization of the machine learning system being stored, iv. associating the optimal parameterizations of the first training with the parameterization of the second training;

optimizing a parameterization of the function in such a way that, given the optimal parameterization of the first training, the function outputs the associated optimal parameterization of the second training;

wherein the machine learning system has quantified parameters for the second training or parameters of the machine learning system are quantified after the second training, the function being parameterized in such a way that the function maps the parameterizations of the first training on the associated quantified parameterization of the second training.

2. The method as recited in claim 1, wherein the optimization of the parameterization of the function takes place in such a way that a cost function is minimized, the cost function characterizing a difference between the parameterizations by the function and the parameterizations in the second training and/or a difference between a prediction accuracy of the machine learning system based on the parameterizations by the function and the prediction accuracy of the machine learning system base on the parameterization of the second training.

3. The method as recited in claim 1, wherein a machine learning system for the second training has a smaller architecture than in the first training and/or a machine learning system is compressed after the second training with respect to its architecture, the function being parameterized in such a way that the function maps the parameterizations of the first training on the parameterization of the second training.

4. The method as recited in claim 1, wherein the function is a linear function or neural network.

5. A method for further training of a machine learning system, so that the machine learning system retains its previously learned properties, comprising the following steps:

parameterizing a function, which outputs a parameterization of the machine learning system for a large number of different data sets, including:

providing a plurality of training data sets, an index (k) being associated with each of the training data sets, repeating the following sequence of steps i. through iv. multiple times:

i. randomly drawing an index (k ∈ 1<=k<=n), ii. first training the machine learning system in succession on the training data sets having an associated index less than or equal to the index drawn, individual optimized parameterizations of the machine learning system being stored for each of the training data sets;

iii. second training the machine learning system on all data sets having an associated index less than or equal to the index drawn, optimal parameterization of the machine learning system being stored, iv. associating the optimal parameterizations of the first training with the parameterization of the second training, optimizing a parameterization of the function in such a way that, given the optimal parameterization of the first training, the function outputs the associated optimal parameterization of the second training;

providing a new data set;

training the machine learning system based on the new data set, to obtain a new, optimal parameterization for the new data set;

adapting the parameterization of the machine learning system using the function as a function of the new, optimal parameterization;

wherein the machine learning system has quantified parameters for the second training or parameters of the machine learning system are quantified after the second training, the function being parameterized in such a way that the function maps the parameterizations of the first training on the associated quantified parameterization of the second training.

6. The method as recited in claim 5, wherein the machine learning system having adapted parameters ascertains a second variable as a function of a first variable, wherein the first variable characterizes an operating state of a technical system or a state of surroundings of the technical system, and wherein the second variable characterizes an operating state of the technical system, or an activation variable for activating the technical system, or a setpoint variable for regulating the technical system.

7. A device configured to parameterize a function, which outputs a parameterization of a machine learning system for a large number of different data sets, the device comprises one or more processors, the one or more processors is configured to:

provide a plurality of training data sets, an index (k) being associated with each of the training data sets;

repeat the following sequence of steps i. through iv. multiple times:

i. randomly drawing an index (k ∈ 1<=k<=n), ii. first training the machine learning system in succession on the training data sets having an associated index less than or equal to the index drawn, individual optimized parameterizations of the machine learning system being stored for each of the training data sets;

iii. second training the machine learning system on all data sets having an associated index less than or equal to the index drawn, optimal parameterization of the machine learning system being stored, iv. associating the optimal parameterizations of the first training with the parameterization of the second training;

optimize a parameterization of the function in such a way that, given the optimal parameterization of the first training, the function outputs the associated optimal parameterization of the second training;

wherein the machine learning system has quantified parameters for the second training or parameters of the machine learning system are quantified after the second training, the function being parameterized in such a way that the function maps the parameterizations of the first training on the associated quantified parameterization of the second training.

8. A non-transitory machine-readable memory medium on which is stored a computer program parameterizing a function, which outputs a parameterization of a machine learning system for a large number of different data sets, the computer program, when executed by a computer, causing the computer to perform the following steps:

providing a plurality of training data sets, an index (k) being associated with each of the training data sets;

repeating the following sequence of steps i. through iv. multiple times:

i. Randomly drawing an index (k ∈ 1<=k<=n), ii. first training the machine learning system in succession on the training data sets having an associated index less than or equal to the index drawn, individual optimized parameterizations of the machine learning system being stored for each of the training data sets;

iii. second training the machine learning system on all data sets having an associated index less than or equal to the index drawn, optimal parameterization of the machine learning system being stored, iv. associating the optimal parameterizations of the first training with the parameterization of the second training;

optimizing a parameterization of the function in such a way that, given the optimal parameterization of the first training, the function outputs the associated optimal parameterization of the second training;

wherein the machine learning system has quantified parameters for the second training or parameters of the machine learning system are quantified after the second training, the function being parameterized in such a way that the function maps the parameterizations of the first training on the associated quantified parameterization of the second training.

* * * * *